3,682,791
ELECTROCHEMICAL REDUCTION OF AROMATIC COMPOUNDS
Joseph S. Matthews, O'Hara Township, Allegheny County, Pa., assignor to Gulf Research & Development Company, Pittsburgh, Pa.
No Drawing. Filed May 6, 1971, Ser. No. 141,017
Int. Cl. C07b 29/06; C07c 5/10
U.S. Cl. 204—59 R                    19 Claims

ABSTRACT OF THE DISCLOSURE

A process for electrochemically reducing aromatic compounds in the presence of a substantially anhydrous system containing an amine, an ammonium salt or an inorganic acid and a catalyst, such as $BF_3$.

---

This invention relates to a process for electrochemically reducing aromatic compounds, particularly for electrochemically reducing benzene to 1,4-cyclohexadiene. The mixture being subjected to electrochemical reduction herein, by passing a direct current of electricity therethrough, is a substantially anhydrous homogeneous mixture containing an aromatic compound, an amine, an ammonium salt or an inorganic acid and a catalyst.

The aromatic compound can be naphthalene, alkyl-substituted naphthalenes, benzene or alkyl-substituted benzenes carrying one or two alkyl substituents thereon, wherein the alkyl substitutents, the same or different, can have from one to four carbon atoms, but preferably is methyl. Examples of such aromatic compounds are naphthalene, alpha-methylnaphthalene, beta-ethylnaphthalene, benzene, toluene, o-, m- or p-xylene, etc. The benzenes are converted principally to 1,4-cyclohexadienes, while naphthalene is reduced principally to 1,4-dihydronaphthalene and eventually to 1,4,5,8-tetrahydronaphthalene.

The amine, which is employed herein as a solvent, can include any amine in which the aromatic compound being reduced is soluble, and can be defined by the following structural formula:

wherein R' can be either hydrogen or an alkyl group having from one to eight carbon atoms, preferably from one to four carbon atoms, and R" can be an alkyl group as defined by R'. Specific examples of amines that can be used are methylamine, ethylamine, butylamine, diethylamine, dibutylamine, etc.

As catalyst any electron deficient compound which is soluble in the amine solvent defined above and which is not inactivated by said solvent can be used. Specific examples of catalysts that can be used are boron trifluoride, aluminum bromide, tetracyanoethylene, etc.

In addition to the above there is also present in the substantially anhydrous system an inorganic acid soluble in the reaction mixture having an ionization constant above about $1 \times 10^{-5}$, preferably in the range of about $1 \times 10^{-4}$ to about $1 \times 10^{-1}$, or an ammonium salt of said inorganic acid soluble in said mixture. Specific examples of inorganic acids or ammonium salts that can be used are hydrogen chloride, ammonium chloride, ammonium nitrate, ammonium bromide, etc.

The amounts of each of the components of the reaction mixture can be varied over a relatively wide range. Thus, based on the total mixture being subjected to reduction herein, the aromatic compound can be present in an amount ranging from about 0.1 to about 50, preferably from about one to about 10 mol percent; the amine from about 40 to about 90, preferably from about 60 to about 80 mol percent; the catalyst from about 0.01 to about two, preferably from about 0.1 to about one mol percent; and the inorganic acid or ammonium salt from about one to about 10, preferably from about three to about six, mol percent.

The pressure and temperature of the mixture during the reaction are not critical. Pressure has no apparent effect on the reaction and therefore atmospheric pressure is preferred. Temperatures can be in the range of about 0° to about 50° C., but a temperature in the order of about 10° to about 30° C. is preferred. Time is not critical and is dependent upon the amount of reduction desired.

The amount of current required for electrolysis can also vary over a wide range. Thus, the amount of current supplied to the reaction system can vary from about 0.01 to about 0.3 ampere per square centimeter of cathode surface area, preferably within the range of about 0.05 to 0.2 ampere per square centimeter of cathode surface area. The electrodes employed are carbon electrodes, preferably graphite.

The reaction is simply effected. The reaction mixture defined above is placed in a cell or vessel containing a carbon anode and a carbon cathode and merely involves passing a direct current of electricity therethrough over a designated period of time. If desired, a divided cell can be used, for example, one containing a fritted glass disc divider. This is not preferred, however, because there is a tendency to clog up the cell divider, current efficiency is reduced, electrical resistance increases, more heat is generated, etc. The resultant mixture can then be subjected to simple distillation procedures to recover the desired reduced product.

In order to exemplify the above a number of runs were made in an undivided cell containing spectroscopic grade graphite rods, except Runs Nos. 12 and 14, in which a zinc or mercury cathode, respectively, was used each of which had a diameter of six millimeters and a cathode surface area immersed in the reaction of eight square centimeters. The solution during electrolysis was stirred magnetically while it was cooled externally by a water bath. During the runs the temperature was maintained at about room temperature, ±5°. Current was supplied by a Technipower Model L 160–30M power supply, wherein the voltage (0–160 v.) or current (0–3 A.) could be regulated. Analysis was made by gas chromatography where possible and peaks, not otherwise identifiable, were identified by mass-gas liquid chromatography. The results obtained are set forth below in Table I and Table II.

TABLE I

| Run No. | Solvent | Ml. | Salt or acid | Gms. | Molar concentration of salt or acid | Catalyst | Molar concentration of catalyst | Mols of benzene | Amps. | Volts | Amp-hours | Mol percent benzene converted | Over-all current efficiency | Current efficiency to— 1,4-cyclo-hexadiene | Current efficiency to— Cyclohexene | Mol percent selectivity to 1,4-cyclohexadiene |
|---|---|---|---|---|---|---|---|---|---|---|---|---|---|---|---|---|
| 1 | EDA | 50 | NH₄Cl | 1.7 | 0.64 | BF₃ | 0.32 | 0.113 | 0.60 | 60 | 1.80 | 19.7 | 86.4 | 60.5 | 25.9 | 70 |
| 2 | EDA | 50 | NH₄Cl | 3.2 | 1.28 | BF₃ | 0.64 | 0.226 | 0.50 | 25 | 2.00 | 3.9 | 30.3 | 21.8 | 8.5 | 72 |
| 3 | EDA | 50 | NH₄Cl | 1.7 | 0.64 | BF₃ | 0.32 | 0.113 | 0.60 | 70 | 2.40 | 21.6 | 66.0 | 48.8 | 17.2 | 74 |
| 4 | EDA | 50 | NH₄Br | 2.9 | 0.60 | AlBr₃ | 0.32 | 0.113 | 0.75 | 30 | 1.50 | 12.8 | 73.5 | 58.2 | 15.3 | 78 |
| 5 | EDA | 50 | NH₄Cl | 1.7 | 0.64 | BF₃ | 0.32 | 0.113 | 0.75 | 30 | 2.25 | 12.3 | 52.3 | 37.4 | 14.9 | 72 |
| 6 | EDA | 50 | NH₄Cl | 1.7 | 0.64 | I₂ | 0.20 | 0.113 | 0.75 | 32 | 2.25 | 7.2 | 24.0 | 18.3 | 5.7 | 76 |
| 7 | EDA | 50 | NH₄Cl | 0.67 | 0.25 | BF₃ | 0.32 | 0.113 | 0.50 | 85 | 2.00 | 6.5 | 23.0 | 19.1 | 3.9 | 83 |
| 8 | EDA | 50 | NH₄Cl | 1.3 | 0.50 | BF₃ | 0.32 | 0.113 | 0.50 | 50 | 2.00 | 12.1 | 40.6 | 31.2 | 9.4 | 77 |
| 9 | EDA | 50 | NH₄Cl | 2.6 | 1.0 | BF₃ | 0.32 | 0.113 | 0.50 | 20 | 2.00 | 2.3 | 7.8 | 6.5 | 1.3 | 83 |
| 10 | CH₃OH | 50 | NH₄Cl | 3.2 | 1.28 | BF₃ | 0.32 | 0.113 | 0.60 | 12 | 1.92 | | | | | |
| 11 | {CH₃OH / (C₂H₅)₂O} | 10 / 50 | HCl | Saturated | | BF₃ | 0.32 | 0.113 | 0.50 | 50 | 1.00 | | | | | |
| 12 | EDA | 50 | NH₄Cl | 1.7 | 0.64 | | | 0.113 | 0.60 | 36 | 1.50 | | | | | |
| 13 | EDA | 50 | NH₄Cl | 1.7 | 0.64 | FeCl₃ | 0.32 | 0.113 | 0.75 | 50 | 3.00 | | | | | |
| 14 | CH₃CN | 50 | HCl | Saturated | | BF₃ | 0.32 | 0.113 | 0.75 | 10 | 1.5 | | | | | |
| 15 | CH₃CN | 50 | NHSCN | 1.8 | 0.47 | BF₃ | 0.32 | 0.113 | 0.75 | 20 | 3.00 | | | | | |
| 16 | EDA | 50 | NH₄Cl | 1.7 | 0.64 | AlCl₃ | 0.32 | 0.113 | 0.75 | 30 | 3.00 | | | | | |
| 17 | EDA | 50 | NH₄Cl | 1.7 | 0.64 | TCNE | 0.20 | 0.113 | 0.75 | 48 | 2.25 | 1.4 | 4.8 | 1.0 | 0.4 | 78 |

Note.—EDA=Ethylenediamine; TCNE=Tetracyanoethylene.

TABLE II

| Run No. | Solvent | Ml. | Salt | Gms. | Molar concentration of salt | Catalyst | Molar concentration of catalyst | Aromatic | Mols of aromatic | Amps. | Volts | Amp-hours | Mol percent aromatic converted | Overall current efficiency | Current efficiency to— Diolefins | Current efficiency to— Monoolefins | Mol percent selectivity to diolefin |
|---|---|---|---|---|---|---|---|---|---|---|---|---|---|---|---|---|---|
| 1 | EDA | 50 | NH₄Cl | 1.7 | 0.64 | BF₃ | 0.32 | Toluene | 0.094 | 0.75 | 45 | 1.5 | 4.5 | 18.4 | 14.3 | 4.1 | 78 |
| 2 | EDA | 50 | NH₄Cl | 1.7 | 0.64 | BF₃ | 0.32 | do | 0.094 | 0.75 | 50 | 1.5 | 6.5 | 30 | 4 | 2.5 | 62 |
| 3 | EDA | 50 | NH₄Cl | 1.7 | 0.64 | BF₃ | 0.32 | o-Xylene | 0.082 | 0.75 | 56 | 1.5 | 6.6 | 26.0 | 4.4 | 2.2 | 67 |
| 4 | EDA | 50 | NH₄Cl | 1.7 | 0.64 | BF₃ | 0.32 | m-Xylene | 0.082 | 0.75 | 55 | 1.5 | 10.0 | 34.0 | 5.3 | 4.7 | 53 |
| 5 | EDA | 50 | NH₄Cl | 1.7 | 0.64 | BF₃ | 0.32 | Mesitylene | 0.082 | 0.75 | 64 | 1.5 | | | | | |

The data in the above tables illustrate the advantages of operating in accordance with the process described and claimed herein. Current efficiency referred to in the tables can be defined by the following:

$$\frac{M(D+2T) \times 5360}{A}$$

wherein M equal the mols of aromatic charge, D equals percent dihydro product according to gas chromatography and T equals percent tetrahydro product according to gas chromatography, and A equals ampere hours used. In each of Runs Nos. 1 to 9, inclusive, benzene was converted to a product composed mainly of 1,4-cyclohexadiene. The amount of benzene converted and the over-all current efficiency was dependent on the amounts of components in the reaction mixture and the amount of current applied thereto. In each of Runs Nos. 12 and 14 no conversion was obtained, since zinc and mercury cathodes, respectively, were used in place of the graphite cathode of Runs Nos. 1 to 9. The use of a solvent other than an amine in Runs Nos. 10, 11, 15 and 16 and the use of a salt other than an ammonium salt of an inorganic acid in Run No. 16 similarly resulted in no conversion of benzene. Although FeCl₃ would normally have been expected to be satisfactory herein, it is believed it did not function as a catalyst in Run No. 13 because it complexed with the amine solvent. It is believed that AlCl₃ did not catalyze the reaction in Run No. 17 because it was not soluble in the reaction medium, while AlBr₃ did serve as a catalyst in Run No. 4 because it was soluble therein. The use of an amine in Run No. 17 in which AlCl₃ was soluble would have rendered the latter a suitable catalyst in the run. Note in Run No. 5 of Table II that the number of alkyl substituents on the ring must be limited to two in order to obtain reduction herein.

Obviously, many modifications and variations of the invention, as hereinabove set forth, can be made without departing from the spirit and scope thereof, and therefore only such limitations should be imposed as are indicated in the appended claims.

I claim:

1. A process for electrochemically reducing an aromatic compound selected from the group consisting of naphthalene, alkylnaphthalenes, benzene and alkyl benzenes carrying from one to two alkyl substituents on the ring in a vessel containing a carbon anode and a carbon cathode which comprises passing a direct current of electricity through a substantially anhydrous homogeneous mixture containing said aromatic compound, an aliphatic amine having 1-8 carbons in a chain, an electron deficient compound soluble in the amine as catalyst and an inorganic compound selected from the group consisting of an inorganic acid having an ionization constant above about $1 \times 10^{-5}$ and the ammonium salt thereof.

2. The process of claim 1 wherein said aromatic compound is naphthalene.

3. The process of claim 1 wherein said aromatic compound is benzene.

4. The process of claim 1 wherein said aromatic compound is o-xylene.

5. The process of claim 1 wherein said aromatic compound is m-xylene.

6. The process of claim 1 wherein said amine is ethylenediamine.

7. The process of claim 1 wherein said inorganic acid is HCl.

8. The process of claim 1 wherein said ammonium salt is NH₄Cl.

9. The process of claim 1 wherein said ammonium salt is NH₄Br.

10. The process of claim 1 wherein said catalyst is BF₃.

11. The process of claim 1 wherein said catalyst is AlBr₃.

12. The process of claim 1 wherein said catalyst is AlCl₃.

13. The process of claim 1 wherein the components of the reaction mixture are present in the following molar percentages: from about 0.1 to about 50 percent aromatic compound, from about 40 to about 90 percent amine, from about 0.01 to about two percent catalyst and from about one to about 10 percent of the inorganic acid or ammonium salt.

14. The process of claim 1 wherein the components of the reaction mixture are present in the following molar percentages: from about one to about 10 percent aromatic compound, from about 60 to about 80 percent amine, from about 0.1 to about one percent catalyst and from about three to about six percent of the inorganic acid or ammonium salt.

15. The process of claim 1 in which graphite electrodes are employed in the electrolysis.

16. The process of claim 1 in which the temperature of the reaction mixture is from about 0° to about 50° C.

17. The process of claim 1 in which the temperature of the reaction mixture is from about 10° to about 30° C.

18. The process of claim 1 in which the mixture being subjected to electrolysis contains benzene, ethylenediamine, $BF_3$ and $NH_4Cl$.

19. The process of claim 1 in which the mixture being subjected to electrolysis contains benzene, ethylene diamine, $AlBr_3$ and $NH_4Br$.

References Cited
UNITED STATES PATENTS

| | | | |
|---|---|---|---|
| 3,485,726 | 12/1969 | Misouo et al. | 204—59 |
| 3,488,266 | 1/1970 | French | 204—59 |
| 3,492,207 | 1/1970 | Yang et al. | 204—59 |
| 3,493,477 | 2/1970 | French et al. | 204—59 |

F. C. EDMUNDSON, Primary Examiner

U.S. Cl. X.R.

204—73 R; 260—667

PO-1050
(5/69)

UNITED STATES PATENT OFFICE
CERTIFICATE OF CORRECTION

Patent No. 3,682,791        Dated  August 8, 1972

Inventor(s)   Joseph S. Matthews

It is certified that error appears in the above-identified patent and that said Letters Patent are hereby corrected as shown below:

Column 2, line 57, "160-30M" should read "160-3M".

Column 3, Table I, Run No. 9 under "Grams", "2.6" should be "2.7".

Signed and sealed this 23rd day of January 1973.

(SEAL)
Attest:

EDWARD M. FLETCHER, JR.
Attesting Officer

ROBERT GOTTSCHALK
Commissioner of Patents